US 6,507,821 B1

(12) United States Patent
Stephanou

(10) Patent No.: US 6,507,821 B1
(45) Date of Patent: Jan. 14, 2003

(54) SYSTEM AND METHOD FOR PROVIDING INFORMATION TECHNOLOGY IT EXPERT REFERRAL OVER A NETWORK

(75) Inventor: Dimitri Stephanou, 19204 Aria Ct., Brookeville, MD (US) 20833

(73) Assignee: Dimitri Stephanou, Brookeville, MD (US)

( * ) Notice: Subject to any disclaimer, the term of this patent is extended or adjusted under 35 U.S.C. 154(b) by 0 days.

(21) Appl. No.: 09/550,655

(22) Filed: Apr. 17, 2000

Related U.S. Application Data

(60) Provisional application No. 60/167,065, filed on Nov. 23, 1999.

(51) Int. Cl.[7] ............................................. G06F 17/60
(52) U.S. Cl. ................................. 705/8; 705/1; 705/26
(58) Field of Search ............................. 705/8, 9, 50, 7, 705/10; 700/49; 706/45, 30, 61; 434/350; 379/265.01–265.14

(56) References Cited

U.S. PATENT DOCUMENTS

| | | | | |
|---|---|---|---|---|
| 5,862,223 A | * | 1/1999 | Walker et al. | 705/50 |
| 6,026,148 A | * | 2/2000 | Dworkin et al. | 379/88 |
| 6,223,165 B1 | * | 4/2001 | Lauffer | 705/8 |
| 6,230,287 B1 | * | 5/2001 | Pinard et al. | 714/31 |
| 6,333,980 B1 | * | 12/2001 | Hollatz et al. | 379/265 |

FOREIGN PATENT DOCUMENTS

DE        19812167 A1 * 12/1999 ........... H04L/12/02

OTHER PUBLICATIONS

Keen. Keen.com Launches First Live Answer Community. Keen.com [online], Nov. 8, 1999 [retrieved on Oct. 24, 2000]. Retrieved from the Internet:<URL: http://www.keen.com/documents/corpinfo/corpinfo/press11899.asp>, pp: (2).*
EXP. EXP press releases on expert advice services at exp.com. Exp.com [online], Jul., 1999 [retrieved on Oct. 24, 2000]. Retrieved from the Internet: <URL: http://www.exp.com/app/display?page=corp_about_us_press_center>, pp: (4).*
www.oracle.com/applications/products/isu.html.
Biz.yahoo.com/prnews/010214/ca_oracle_10.html.

* cited by examiner

Primary Examiner—Tariq R. Hafiz
Assistant Examiner—D. Robertson
(74) Attorney, Agent, or Firm—Roberts Abokhair & Mardula LLC

(57) ABSTRACT

A system and method for assigning an IT expert to a request for assistance. The invention allows users to request assistance over the Internet to an IT expert server having a file of qualified IT experts. The trouble "ticket" is assigned and alias and is sent out to a number of IT experts having the correct qualifications who then have an opportunity to respond. The first to respond is assigned an alias and communicates with the requester via the IT expert server. Upon completion of the ticket, the IT expert so designates and the requester is asked to fill out a survey noting the satisfaction with the service provided. IT experts are assigned rankings and are paid and solicited for further work based upon the ranking.

20 Claims, 21 Drawing Sheets

| | |
|---|---|
| FIRST NAME | John |
| LAST NAME | Smith |
| PASSWORD | ******** |
| CONFIRM PASSWORD | ******** |
| COMPANY | |
| E-MAIL | jsmith@aol.com |
| ADDRESS 1 | 123 Main St. |
| ADDRESS 2 | |
| CITY | AnyTown |
| STATE | AnyState |
| ZIP | 12345 |
| COUNTRY | USA |

SUBMIT INFO    CLEAR FORM

Fig. 6

TOOL BAR

| | |
|---|---|
| I AM AN EXPERT! | |
| | FIRST NAME: Fadi |
| | LAST NAME: Eidi |
| WHO CAN JOIN? | PASSWORD: ******** |
| FAQ | CONFIRM PASSWORD: ******** |
| HOW IT WORKS | BY E-MAIL: fadie@expion.com |
| TICKET HISTORY | BY PHONE: |
| SIGN UP | BY FAX: |
| MY PROFILE | BY MAIL: |
| | CITY: Bethesda |
| | STATE/PROVINCE: MD |
| | POSTAL CODE: 20817 |
| | COUNTRY: USA |

234

236 — NEXT   RESET

SAVE AND EXIT

SYSTEM AND METHOD FOR PROVIDING INFORMATION TECHNOLOGY IT EXPERT REFERRAL OVER A NETWORK

RELATIONSHIP TO OTHER APPLICATIONS

This application is a utility application which claims the benefit and priority of Provisional Application No. 60/167,065 entitled "System and Method for Providing Expert Help Over a Network" filed Nov. 23, 1999.

FIELD OF THE INVENTION

This invention relates generally to network access to for IT expert referral. More particularly the present invention provides a system and method for obtaining assistance via network notification to information technology (IT) experts and subsequent IT expert-to-customer contact.

BACKGROUND OF THE INVENTION

As computers and software proliferate, the need for help desk assistance becomes more and more critical especially to those customers who are not technically sophisticated. The difficulty is that individual customers become frustrated when they must sit on a help line for many hours before they get human assistance or, equally frustrating, are shunted to a frequently asked question screen, which has the answers to many questions that are not helpful for the particular problem that the individual customer is experiencing.

The present invention seeks to solve these problems by qualifying and establishing a large number of IT experts in various hardware and software fields. For example, the present invention will solicit and store qualifications for IT experts in Microsoft Windows, Sun products, Apple products, and indeed, many other hardware and software products. These IT expert, most of whom will be independent contractors (although not necessarily so), will be directly accessible via the database of the present invention.

After registration with the system of the present invention and providing customer contact information such as telephone number and email, when a customer needs particular assistance with a particular product, the customer will access the website of the present invention and state the problem being experienced. Once a query for help is made, the system of the present invention sends a pager or other notification signal to an appropriate IT expert who can handle the problem being experienced by the customer. Indeed, a call may go out to multiple IT experts all of whom have the option to respond to the particular request. Contact information is also presented to the IT experts in this first communication.

Whichever IT expert responds first to the request, that IT expert will have the contact information to immediately contact the customer experiencing the problem. In this fashion, one of the key problem areas, that is time of responding to a problem, is minimized.

The IT expert can then respond either via email through the server of the present invention to the customer or via internet telephone through the server of the present invention to the customer. In either case response goes through the server of the present invention in order to be able to track such statistics as response time, and whether the customer was satisfied or dissatisfied with the response of the particular IT expert.

Once the problem is solved, the customer who experienced the problem is given the option of responding to a questionnaire simply asking if the problem was solved, if the IT expert was responsive to the question, and several other key questions that will assist the system of the present invention in evaluating the performance of the IT expert.

Statistics will be kept on the performance of IT experts involved in the system. For those IT experts who continually rank highly, calls for assistance will continue to go to those IT experts on a priority basis. For those IT experts who are not as successful, they will fall lower in the priority list and will not receive as many calls for assistance from the system.

A key aspect of the present invention is that the system is adaptive. If an Expert who is lower on the priority list continues to get high grades from customers for accomplishing tasks, that Expert can climb in the rankings and achieve a priority ranking thereby receiving more request for assistance and hence, more revenue from responding to customers needs. Conversely, those IT experts who do not receive favorable rankings from customers will fall in the overall rankings of IT experts and will not receive as many phone calls for assistance an hence, will not receive as much revenue from the present invention.

All transactions, in the preferred embodiment occur via the Internet, although this not meant as a limitation, whether they be by email, or Internet telephone. It will be apparent to those skilled in the art that communication between customer and Expert can also occur via telephone as well. And all transactions will proceed through the server of the present invention so that activities of IT experts and statistics on types and frequencies of certain troubled calls can be monitored.

In summary what is created is a virtual help desk, having IT experts in many different areas of IT expertise immediately and competently responding to the queries for help from customers who are in need.

BRIEF DESCRIPTION OF THE FIGURES

FIG. 6 illustrates a screen consisting of a data entry sheet requesting a plurality of answers pertaining to customer identification.

FIG. 15 illustrates a plurality of requests for items of information regarding contact information for the IT expert(s).

FIG. 18 illustrates a plurality of items of information regarding references for IT experts.

DETAILED DESCRIPTION OF THE INVENTION

Figure 1:
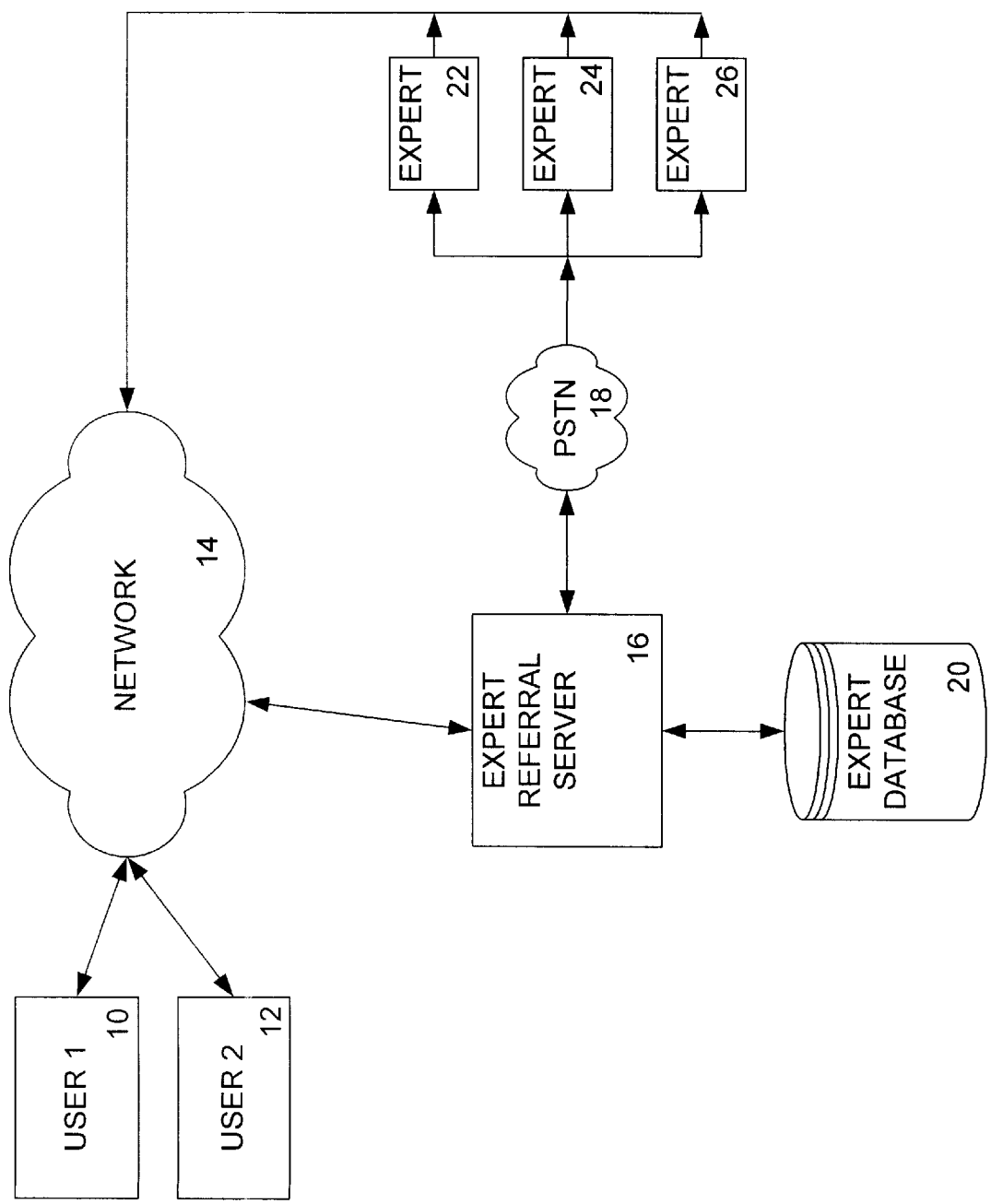
FIG. 1 illustrates the architecture of the present invention.

Referring to FIG. 1, the overall architecture of the present invention is illustrated. A plurality of customers, indeed anyone connected to the internet 6 or a network contemplated as one to be used with the present invention, her illustrated simply as two customers, customers 10 and 12, who are connected to the internet, may experience some form of computer-related or other type of problem. Customers 10, 12 contact the Expert Reference Server (ER Server) 16 via a network, preferably the Internet 14 although this is not meant as a limitation. For example other networks in addition to the Internet can also be used. Customers 10, 12 pose the particular question or problem being encountered with their system to the ER Server 16 over the network 14. Depending upon the type of problem cited, ER Server 16 reviews its database of IT experts 20 for the individual or individuals who are capable of responding to the questions from customers 10, 12. This database of IT experts not only has qualifications of the IT experts but also maintains a database of their availability if, for example, an Expert is on vacation for a period of time or is unavailable during a period of the day. Upon determining the appropriate individual(s) who can respond to the problem, ER Server 16 sends a message via any means known in the art such as wired or wireless as in the case of beepers and cell phones, in this case illustrated as over the public switch telephone network (PSTN) 18 to the beepers of IT experts 22, 24, 26 with a general reference to the type of problem being encountered. This notification via PSTN is for illustrative purposes only. It is anticipated that the IT experts can also be notified via the Internet and the various means, such as Internet paging and telephone for example, available via the Internet.

IT experts 22, 24, 26 are beeped and, preferably an alphanumeric display noting the problem being posed by customers 10, 12 is displayed. At that point any one of the IT experts 22, 24, 26 can respond to ER Server 16 that he will handle the problem being posed. Contact from IT experts 22, 24, and 26 can occur via the public switch telephone network 18 or via the network 14 to the ER Server 16. Thereafter, and assuming, for example expert 22 responded first to the query, ER Server 16 allows contact between expert 22 and, for example customer 12 in the following fashion:

Internet telephone service can be used whereby expert 22 is connected to customer 12 through server 16. In this fashion, ER Server 16 can monitor the length of the call and broker the connection between expert 22 and customer 12. Alternatively, the telephone number of customer 12 can be provided to expert 22. Thereafter, expert 22 can contact customer 12 to solve the problem by voice communication. Finally, ER Server 16 can provide the email address of customer 12 to expert 22 thereby allowing email response to the problem being posed and also allowing back and forth communication over network 14.

After the completion of the service call, expert 22 provides notification to ER Server 16 that the call has been successfully completed. Expert Server 16 logs the completion time and date of the trouble call that was requested by the customer. In this way, statistics on the general length of time to respond to and solve customer problems can be logged. Further, information on the individual expert can also be kept in the following fashion:

ER Server 16 not only brokers a trouble call between customers 10, 12 and IT experts 22, 24, and 26, but also keeps track of how well the individual IT experts perform in their assigned tasks. For example, at the completion of each trouble call, and after the expert has provided notification to the ER Server that the call has been completed, the ER Server provides a questionnaire to the customers 10, 12 seeking input on customer satisfaction with the service being offered. At that point, customers 10, 12 have the opportunity to respond to ER Server 16 regarding whether the IT experts 22, 24, or 26 solved the problem successfully and in a timely fashion.

ER Server 16 collects statistics on the performance of IT experts 22, 24, and 26, thereby monitoring the performance of these IT experts. If any of the IT experts continually score poorly in the estimation of customers 10, 12, the ranking of that particular expert will be established as lower than that of the IT experts who perform successfully on various assigned tasks. This has several ramifications. If a particular expert does not perform well, that expert is put low on the priority list for being contacted by ER Server 16. If the expert continues to perform poorly on the tasks that are assigned, eventually the expert will be eliminated from the roll of IT experts who can respond to service calls. Conversely, if an individual expert who initially performed poorly begins to perform better on service calls assigned to that IT expert, ER Server 16 will keep track of that improvement thereby raising the priority of that expert and list of IT experts who will be called to respond to service calls. In this fashion, expert database 20 is continually updated and quality control on the IT experts who are contacted and assigned customer tasks can therefore be maintained.

In this fashion, a series of problems are solved by the system and method of the present invention. First, individual customers 10, 12 no longer have to wait inordinate amounts of time for response to trouble calls on their computer systems.

Server 16 establishes the mutual arrangement between customers 10 and 12 before any service call is made to IT experts 22, 24, and 26. In this fashion, IT experts 22, 24, and 26 do not have to be concerned about how to invoice and collect fees from customers 10, 12.

Customers 10, 12 benefit from having the best IT experts who can solve technical problems since the ER Server 16 continually updates and establishes quality control via its expert database 20 over the IT experts who are called to respond to trouble calls in the first place.

On a periodic basis, ER Server 16 and the business entity that surrounds that server, remits to IT experts 22, 24, and 26 their fees for the service calls responded to on a monthly or quarterly basis as desired.

Figure 2A:
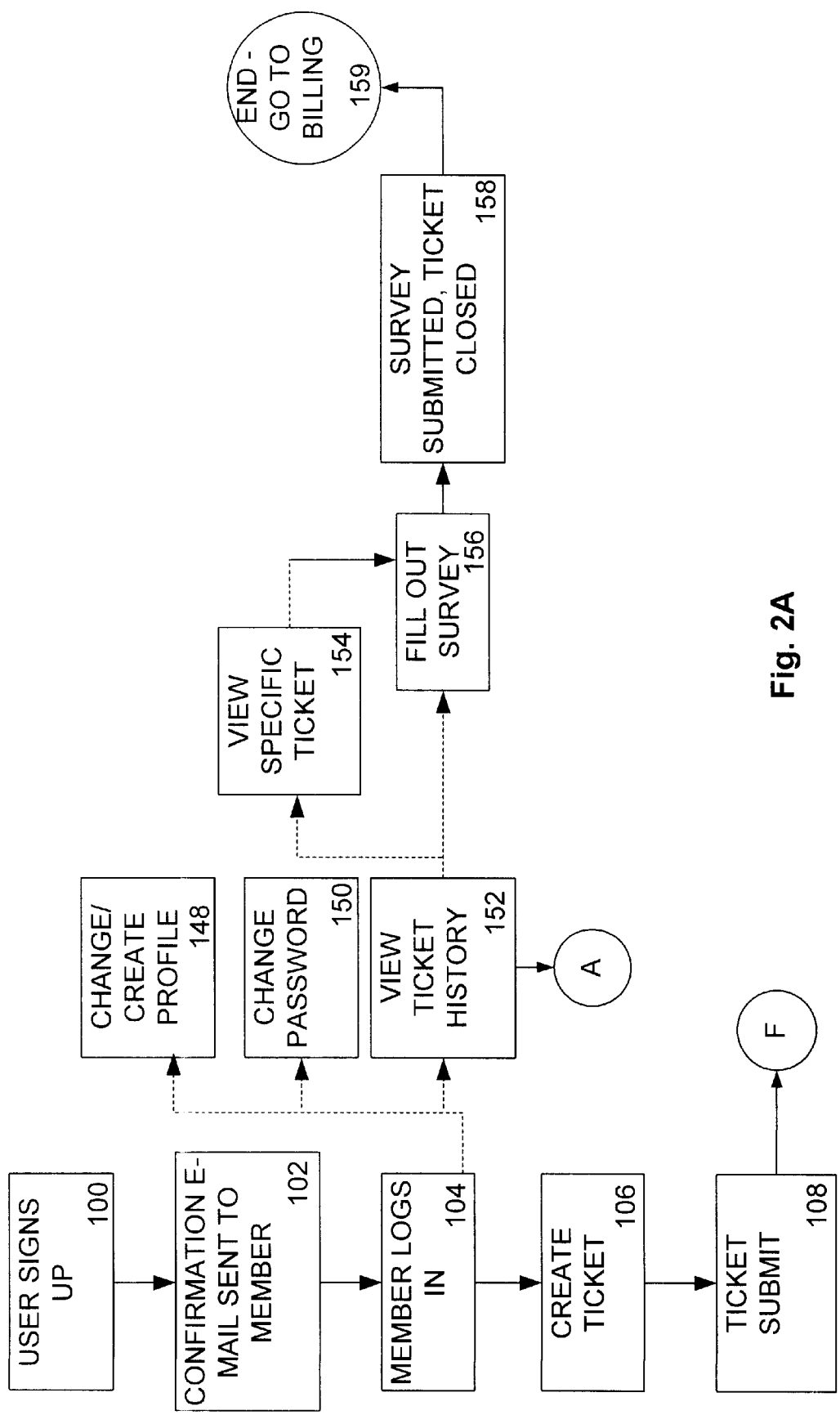
FIG. 2 illustrates the overall assign up, assignment, and Expert response flow of the present invention.
Figure 2B:
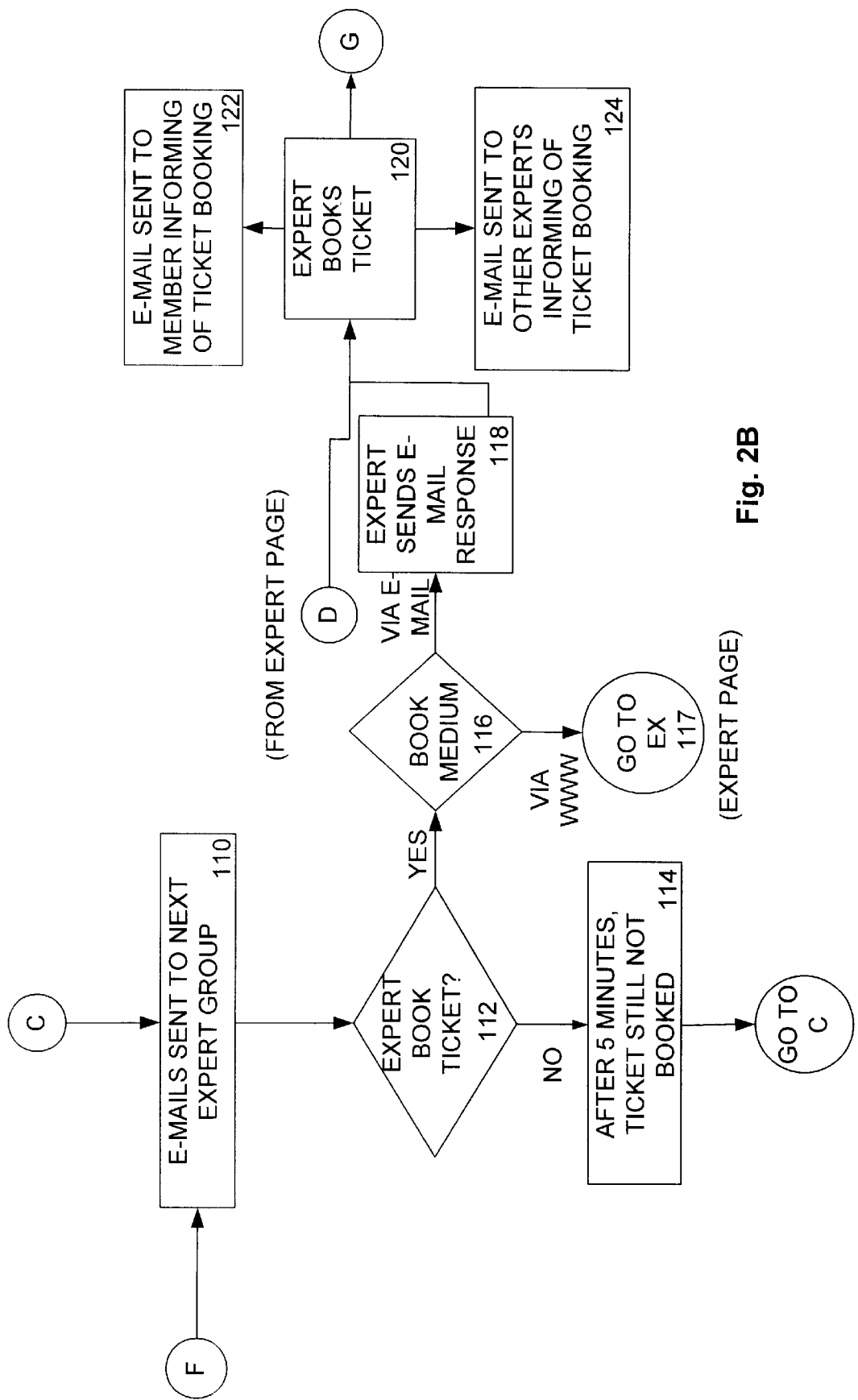
Figure 2C:
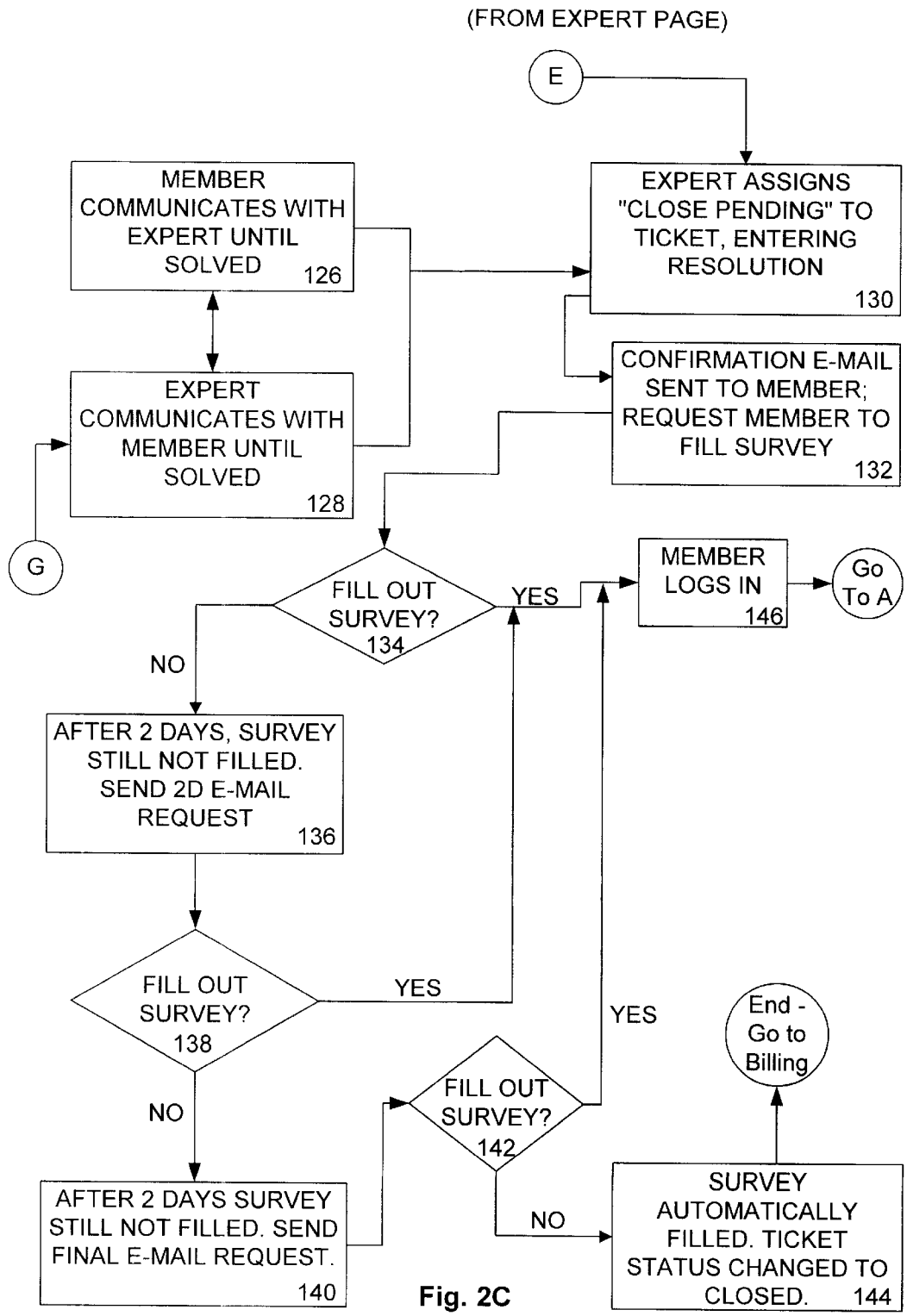

Referring now to FIG. 2 the overall assign up, assignment, and expert response flow of the present invention is illustrated. A customer accesses the system of the present invention 100 preferably over the Internet although this is not meant as a limitation. For example, a customer may also provide information via a telephone or other means of communication.

Confirmation of the sign-up is then sent to the member via electronic mail 102 providing a log in ID and password. Thereafter, either immediately upon receipt of the e-mail or on a subsequent occasion when services are needed the member logs into the system 104. At this point the member has a number of options.

If the member is signing on initially the member can create or change the membership profile 148. This profile provides information on the member's organization, the type of equipment, and any other information relating to software and operating systems being run on the equipment and the network as appropriate.

The member also has the option of changing the member's password 150. If the member has already provided a request for assistance referred to as a "ticket" a member can view the ticket history 152. If the ticket relates to a particular problem that the member has asked to be solved, the member can view the specific ticket 154 to insure that the problem has been stated appropriately. Additionally the member is asked to fill out a survey 156 that relates to how well the problem was solved, was the problem solved in a timely way, was the interaction with the Expert satisfactory and other factors that would give rise to quality assurance with respect to managing the IT experts who are affiliated with the system of the present invention. After the survey is completed it is submitted by the member 158 and the ticket is closed by the system. Thereafter billing for the services is accomplished 159.

Once the member has an account number and a password, the member can call in at any time whenever there is a problem requiring a consultant. In this instance, a member logs onto the system 104 and creates a ticket 106 which describes the difficulty being encountered in as much detail as possible. Once the screen detailing the problem has been completed the ticket is submitted 108 by the member. Confirmation email is sent to the member. The server of the present invention then takes the ticket that is submitted and e-mails it 110 to the appropriate IT expert group for response. In this instance the group may be a group of network IT experts, a group of IT experts in a particular software application, and the like. It should also be noted that communication with the IT expert groups is made by regular e-mail and wireless devices to the extent that the database has the appropriate communication information. This system then continually inquires to determine if any IT expert has responded to the ticket and indicated that he or she would respond. This is referred to as "booking" the ticket 112. If after a definable number of minutes the ticket is still not booked 114 the system sends e-mails to another group of IT experts who can appropriately respond to the question being posed.

If the ticket has been booked by an IT expert 112 the system determines how the ticket was booked 116. If the IT expert responded over the Internet the Internet procedures invoked 117 as will be more fully explained below.

If the IT expert responded via e-mail the IT experts e-mail response is received by the system 118 and the system assigns the ticket to the IT expert who responded 120.

Upon assigning the ticket to the IT expert 120 an e-mail or other notification is sent to the IT expert requesting that he initiate customer contact. In addition, e-mail is sent to other IT experts in the group of IT experts to whom e-mail was sent informing them that the ticket was booked to another IT expert 124 although the identify of the IT expert to whom the ticket was booked is not necessarily disclosed.

As further noted below, communication and record keeping of the system involves assigning alias numbers to both the request for assistance and for the response by the IT expert in order to ensure that communication flows through the server of the present invention.

The IT expert then communicates with the member 128 and the member interacts with the IT expert 126 to solve the problem disclosed in the ticket.

When the ticket has been closed, that is, the problem has been solved by the IT expert, the IT expert so notifies the server of the present invention to close the ticket and enters information that describes how the problem was resolved 130. The server then sends an e-mail message to the member 132 noting that the IT expert has closed the ticket and has solved the problem. The e-mail also requests that the member fill out a survey to note the members satisfaction with the problem solution, the IT experts performance, and any other factor that affects the resolution of the ticket originally submitted by the member.

The survey is a critical aspect of the present invention and is done in an automated fashion to minimize the labor associated with the member's participation in the survey. Further, the survey serves as a basis for paying IT experts for work accomplished or not paying IT experts when the result has been unsatisfactory to the member.

After submission of the survey to the member, the system continually inquiries in its own records to determine if the survey report has been filled out 134. If the survey has not been filled out after two days, a second e-mail request for the completion of the survey is sent to the customer 136. The system then again keeps track internally to determine if the survey has been filled out 138. If the survey has not been filled out after, for example two days, a final e-mail request is sent to the member 140 to fill the survey out. The system then again internally monitors whether the survey has been completed 142. If the survey has not been completed the survey is automatically filled in with certain default values and the ticket status is changed to a "closed" status 144. Thereafter billing of the member ensues 145.

When the member is in the process of completing the survey the member logs in 146 and views the ticket history 152.

The member can then complete the survey as noted earlier 156 and submit that survey to the system 158. Thereafter billing ensues.

Figure 3:
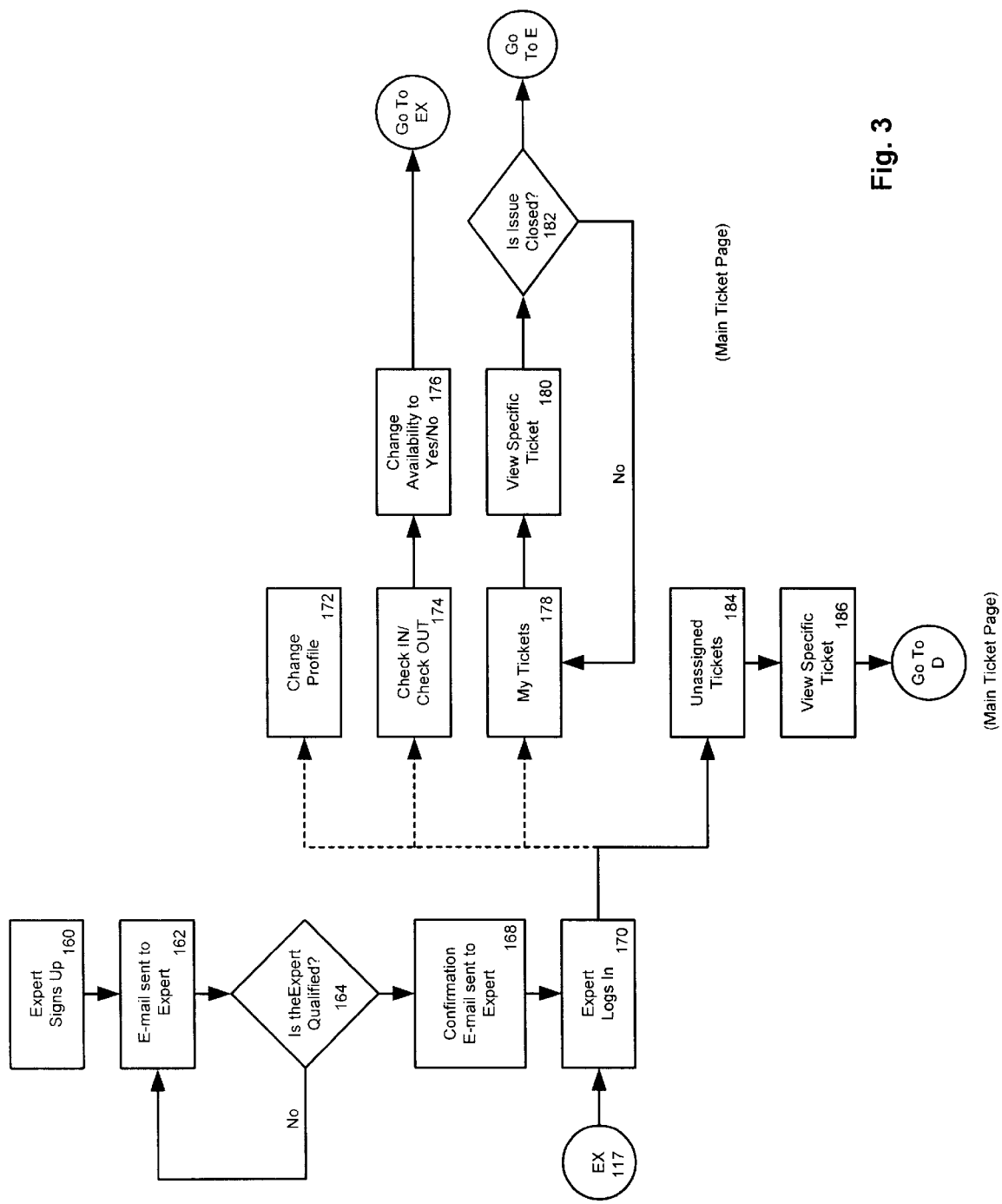
FIG. 3 illustrates the Expert enrollment and interaction with the system of the present invention.

Referring now to FIG. 3 the IT expert enrollment and interaction with the system is illustrated. An IT expert initially logs onto the system of the present invention and signs up to become an IT expert 160 who can be called upon to satisfy various tickets. The system of the present invention then sends an e-mail to the IT expert 162 confirming his registration and informing him of the pending assessment of the IT expert qualifications, and that this will take place BEFORE the IT expert is assigned any tickets by the system. In this way the entity managing the server of the present invention ascertains the IT expert's qualifications and areas of IT expertise. If the IT expert is not qualified in any of the areas in which the system responds to members an e-mail is sent to the IT experts so notifying the IT expert. If the IT expert has the requisite qualifications a confirmation e-mail is sent to the IT expert 168 and the IT expert is then logged onto the system. The IT expert is assigned a password and customer identification number for which the IT expert can then log in 170.

At any point the IT expert can change or alter the IT expert's profile 172 thereby allowing the IT expert to more particularly respond to and be provided with information on tickets.

When the IT expert logs in 170 the IT expert can check in and out of the system 174 and change the IT expert's availability 176 so that the system knows when the IT expert will be available to receive requests for ticket response.

The IT expert can also note the IT experts own tickets 178 that have been responded to, assigned and are in progress. The IT expert can click on any ticket that is noted and view a specific ticket 180 and determine if the ticket has been closed 182. If the ticket is not closed, it continues to be listed on those open tickets assigned to the IT expert 178. If the ticket is closed as far as the IT expert is concerned, the IT expert assigns a "close pending" to the ticket as noted earlier in FIG. 2 130.

Once the IT expert logs in 170 the IT expert can also go to a file of unassigned tickets 184 and view any specific one ticket 186 and determine if the IT expert can respond to the ticket. If the IT expert can respond the IT expert will book the ticket as noted earlier in FIG. 2 120.

Figure 4:
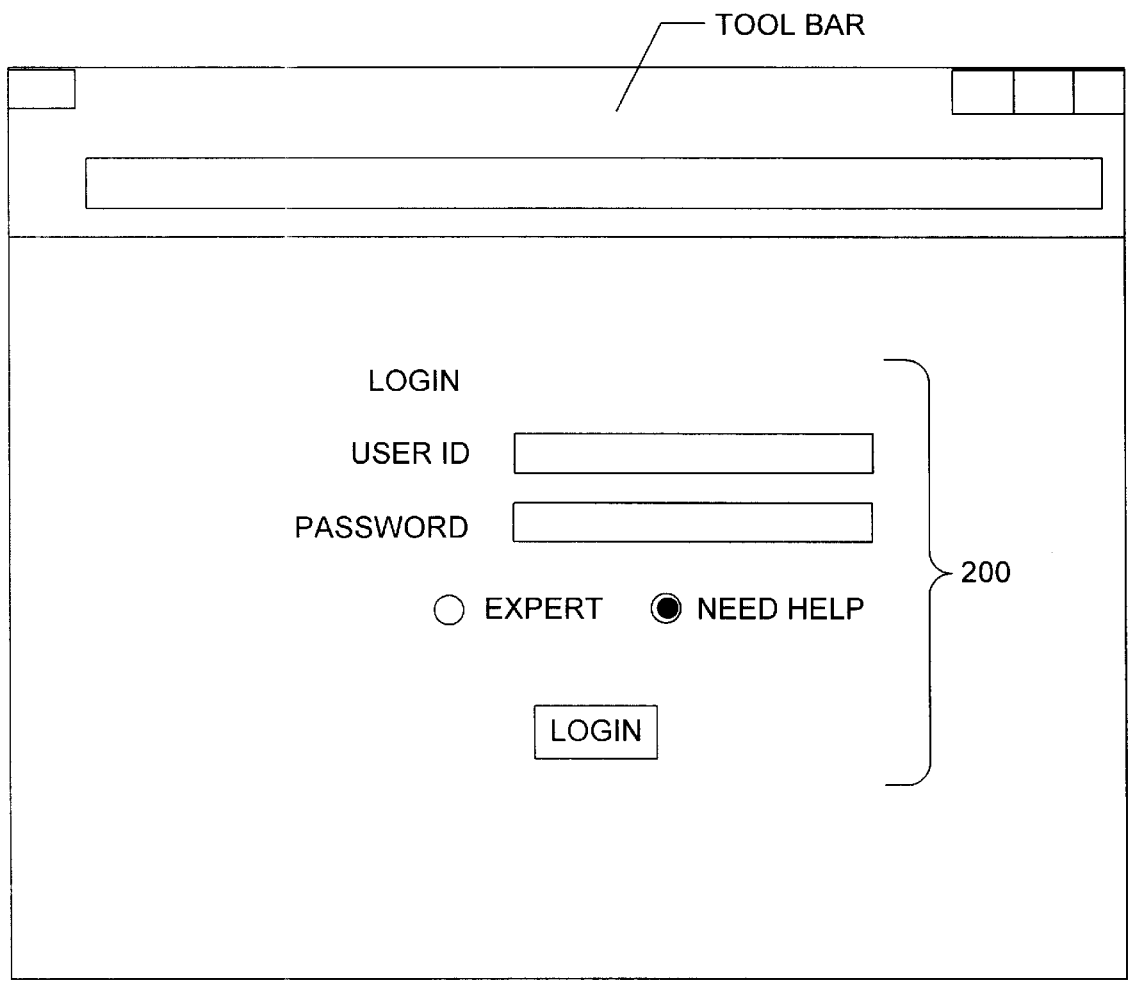
FIG. 4 illustrates login screen for the Expert Help Network.
Figure 5:
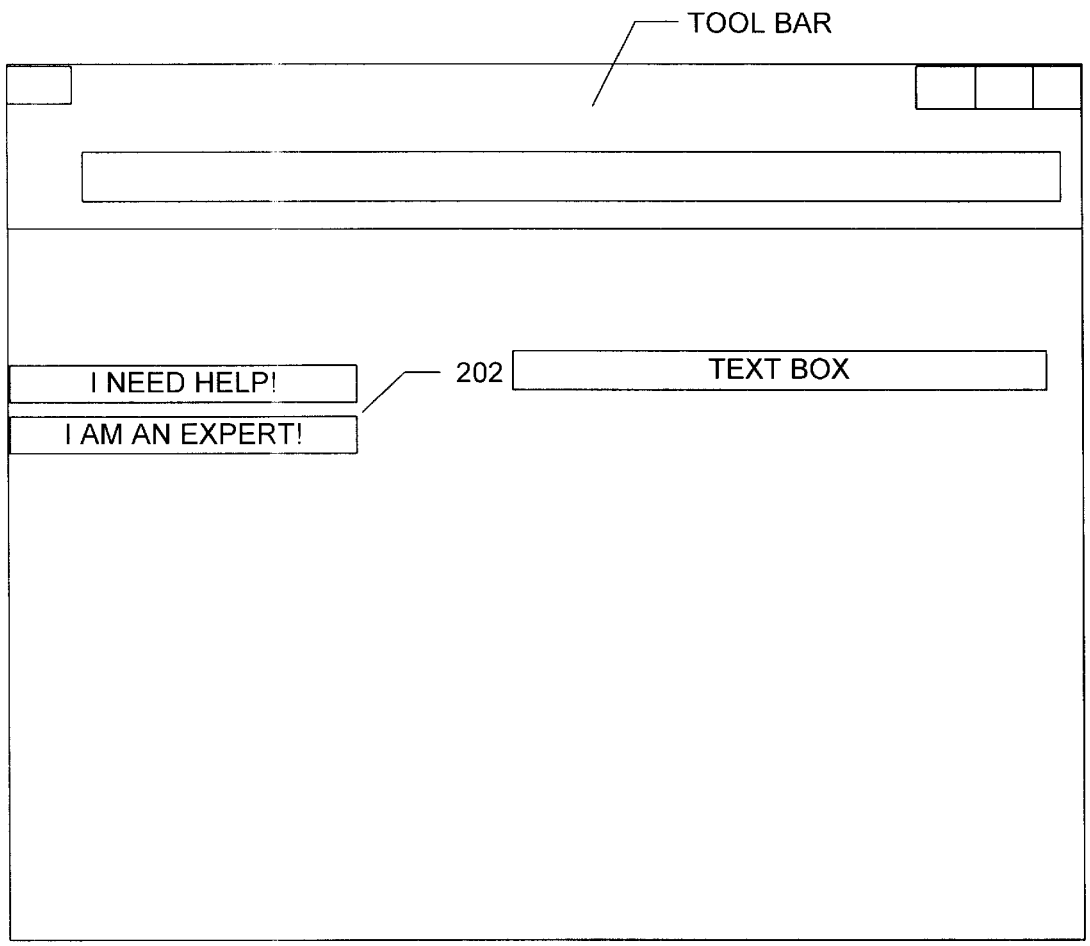
FIG. 5 illustrates a screen in which the customer selects whether he needs help or is an IT expert.

Upon entering the website, FIG. 4, the customer is presented with a login screen which asks also whether the customer is an IT expert or needs help 200. If the customer is not a member of the service, he is presented with a screen, FIG. 5, in which he must select whether he needs help or he is an IT expert 202.

Figure 7:
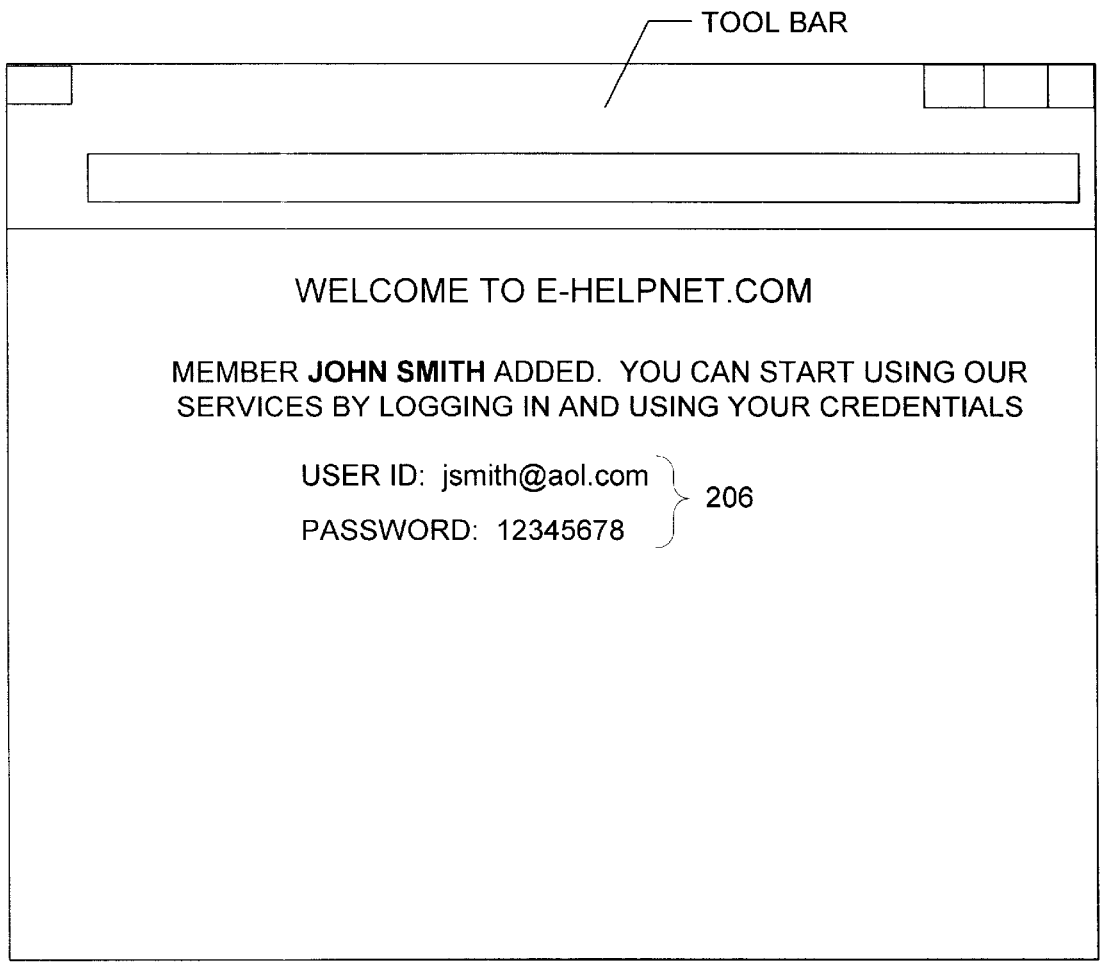
FIG. 7 illustrates the customer's customer ID and password for entering the Expert Help Network.

If the customer selects the "I need help" option 202, the customer is presented with a screen, FIG. 6, which consists of a data entry sheet requesting a plurality of answers pertaining to customer identification 204. Upon completion of the data entry sheet, FIG. 6, the customer is presented with a screen, FIG. 7, which furnishes the customer with his customer ID and password 206.

Figure 8:
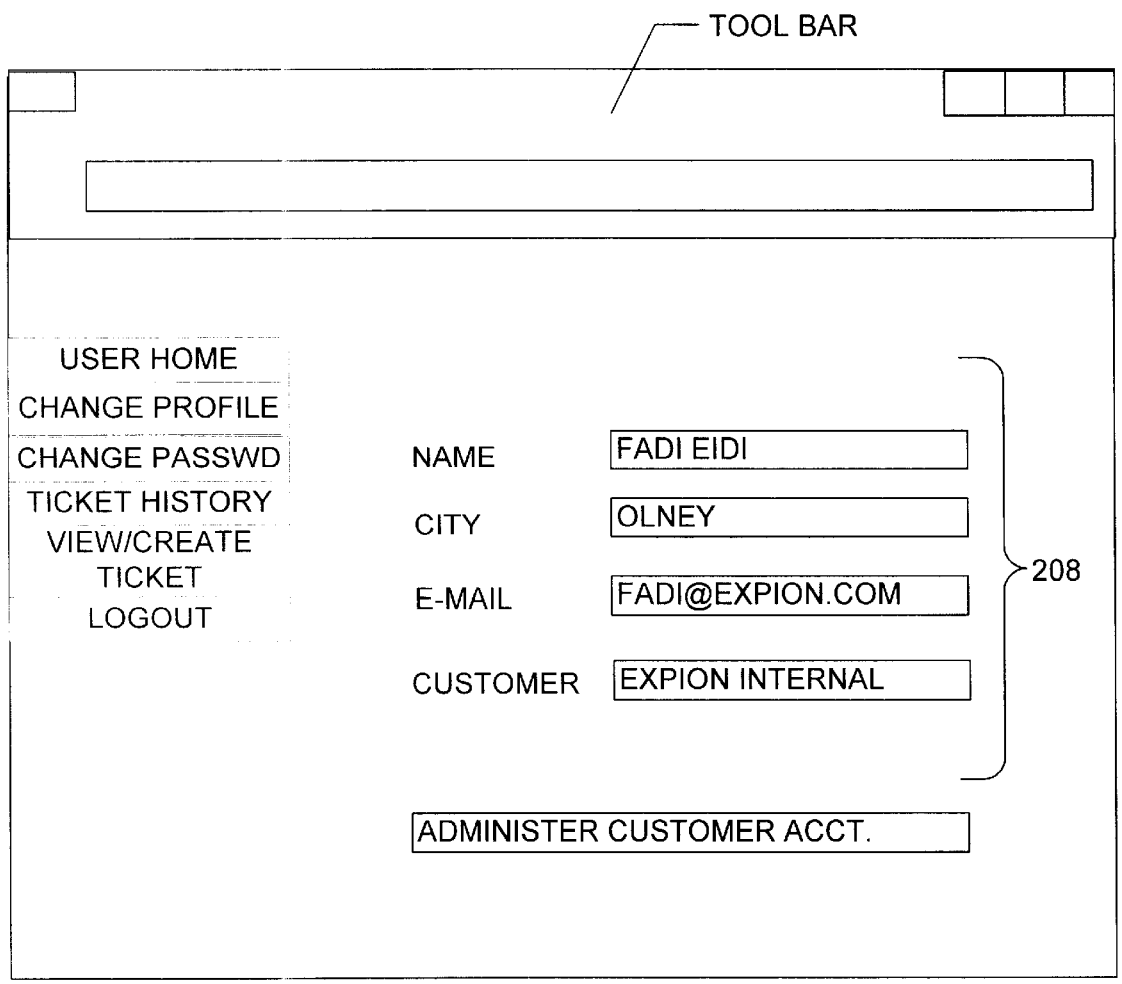
FIG. 8 illustrates a screen which confirms the customer's Name, city, and email address that is currently valid in the system.
Figure 9:
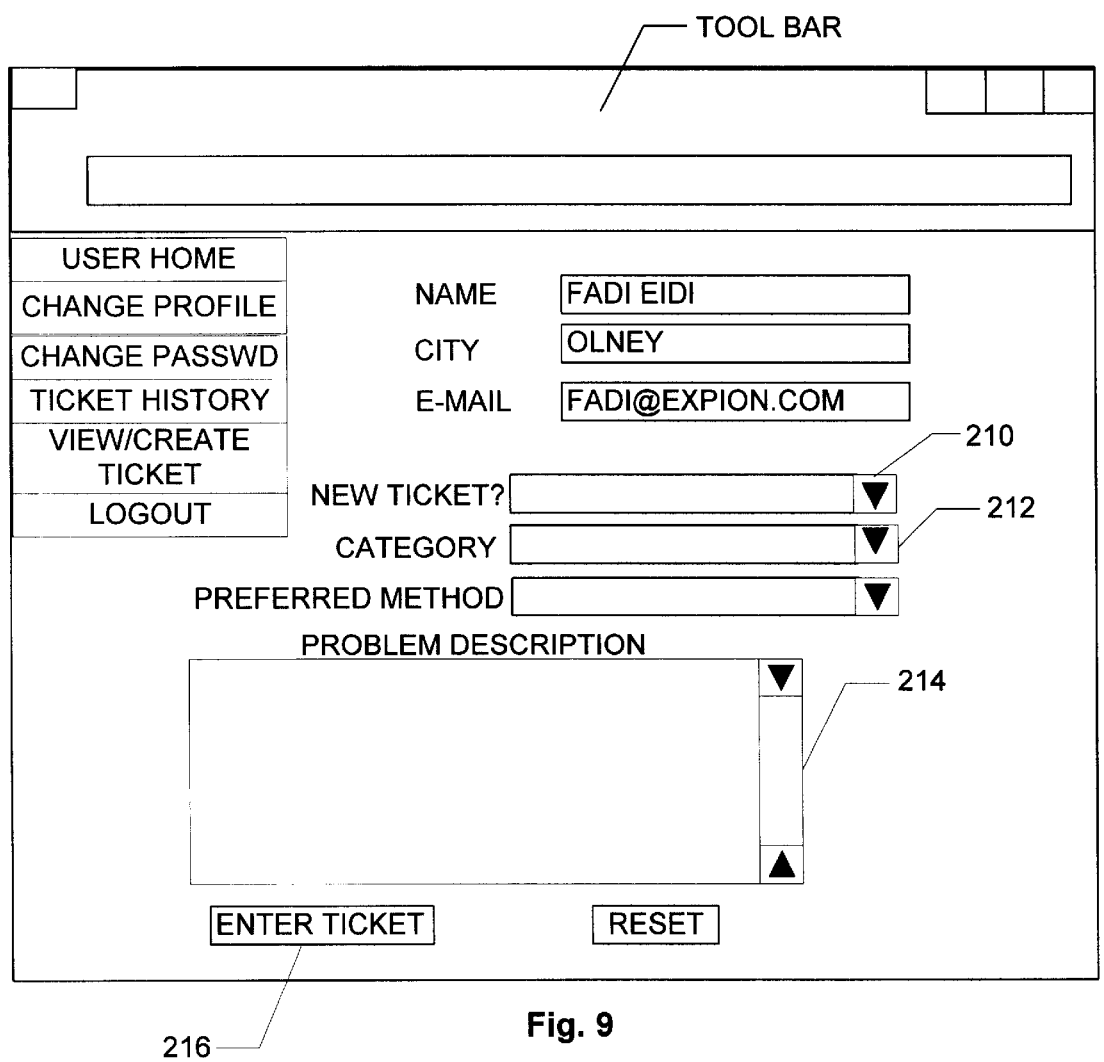
FIG. 9 illustrates a plurality of questions pertaining to the customer's problem.

In the Customer Home screen FIG. 8, which confirms the customer's Name, City, and email address 208 that is currently valid in the system. Upon selecting "View/Create Ticket" the customer is presented with a screen, FIG. 9, which asks whether this is a new ticket 210 and under what category this ticket is to be considered 212. Examples of categories are MS Exchange, Windows NT, etc. Additionally, the customer is furnished with a text box in which he enters a description of his current problem 214. The customer is also presented with a button which allow him to enter the ticket 216.

Figure 10:
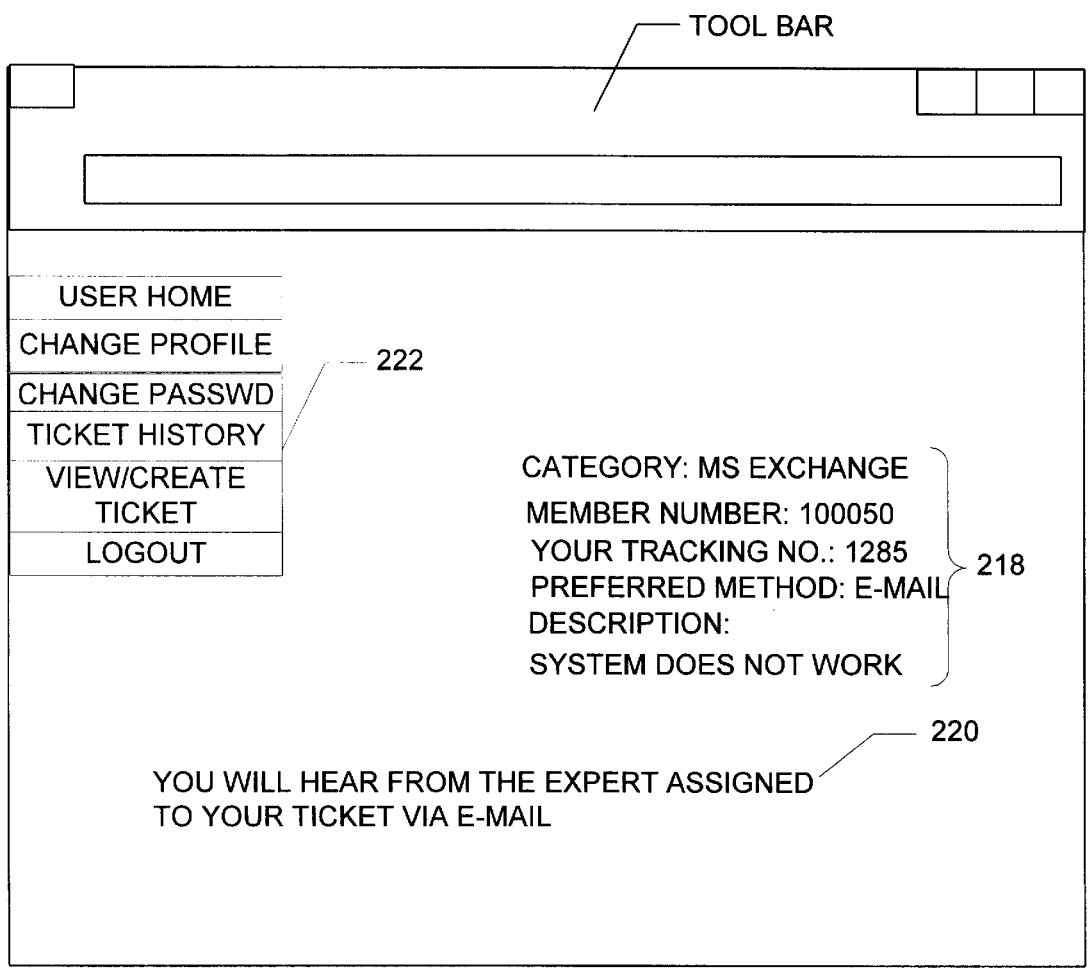
FIG. 10 illustrates a plurality of items of information regarding the customer's ticket.

Once the ticket is entered, the customer is presented with a screen, FIG. 10, which furnishes a plurality of items of information regarding the customer's ticket 218. The customer is notified by the IT expert via email (although this is not meant as a limitation) when he has been assigned to the trouble call 220 by the server.

Figure 11:
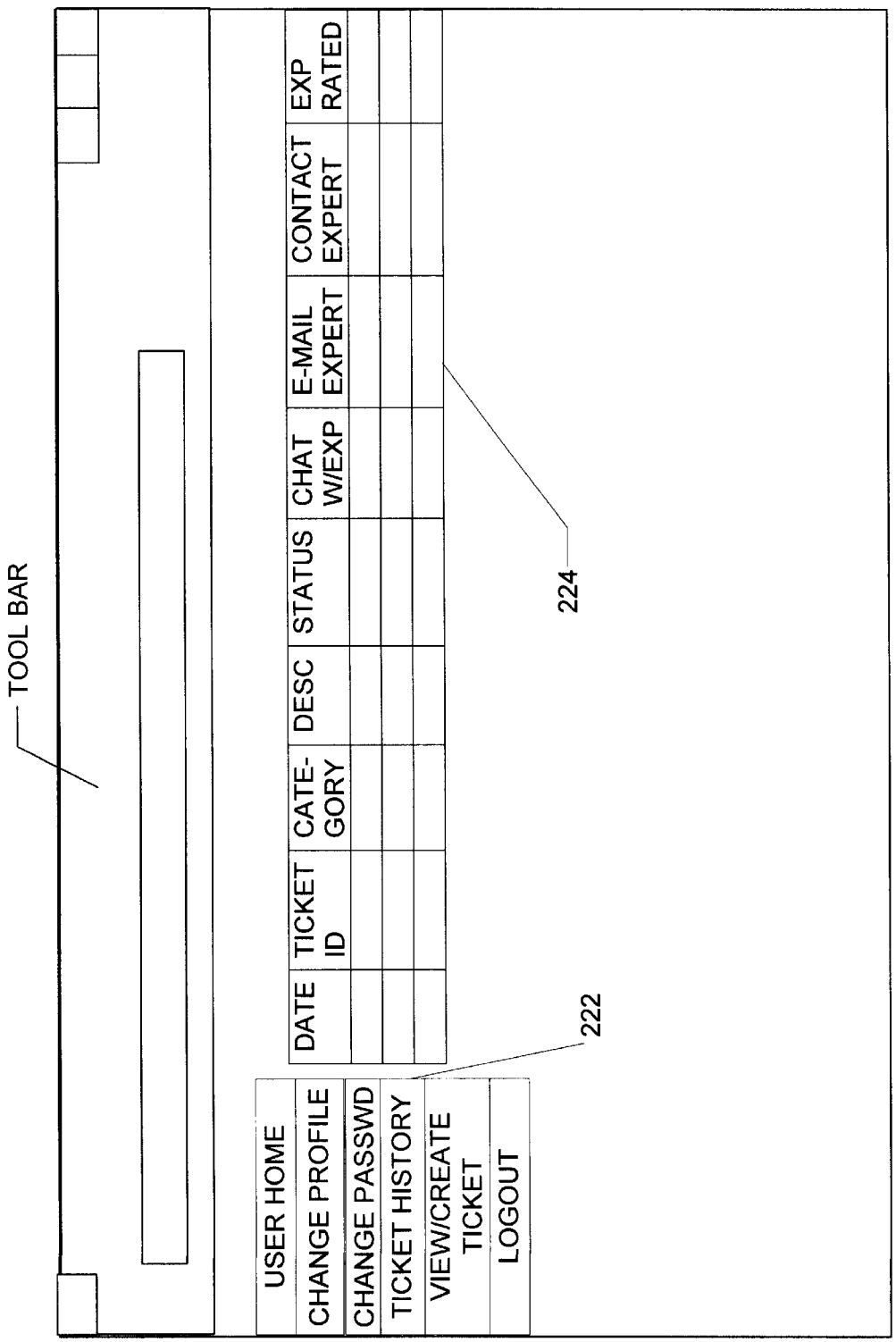
FIG. 11 illustrates a plurality of statuses regarding the customer's ticket(s).

If the customer selects "Ticket History," 222 he is presented with a screen, FIG. 11, which furnishes a plurality of statuses regarding his ticket(s) 224.

Figure 12:
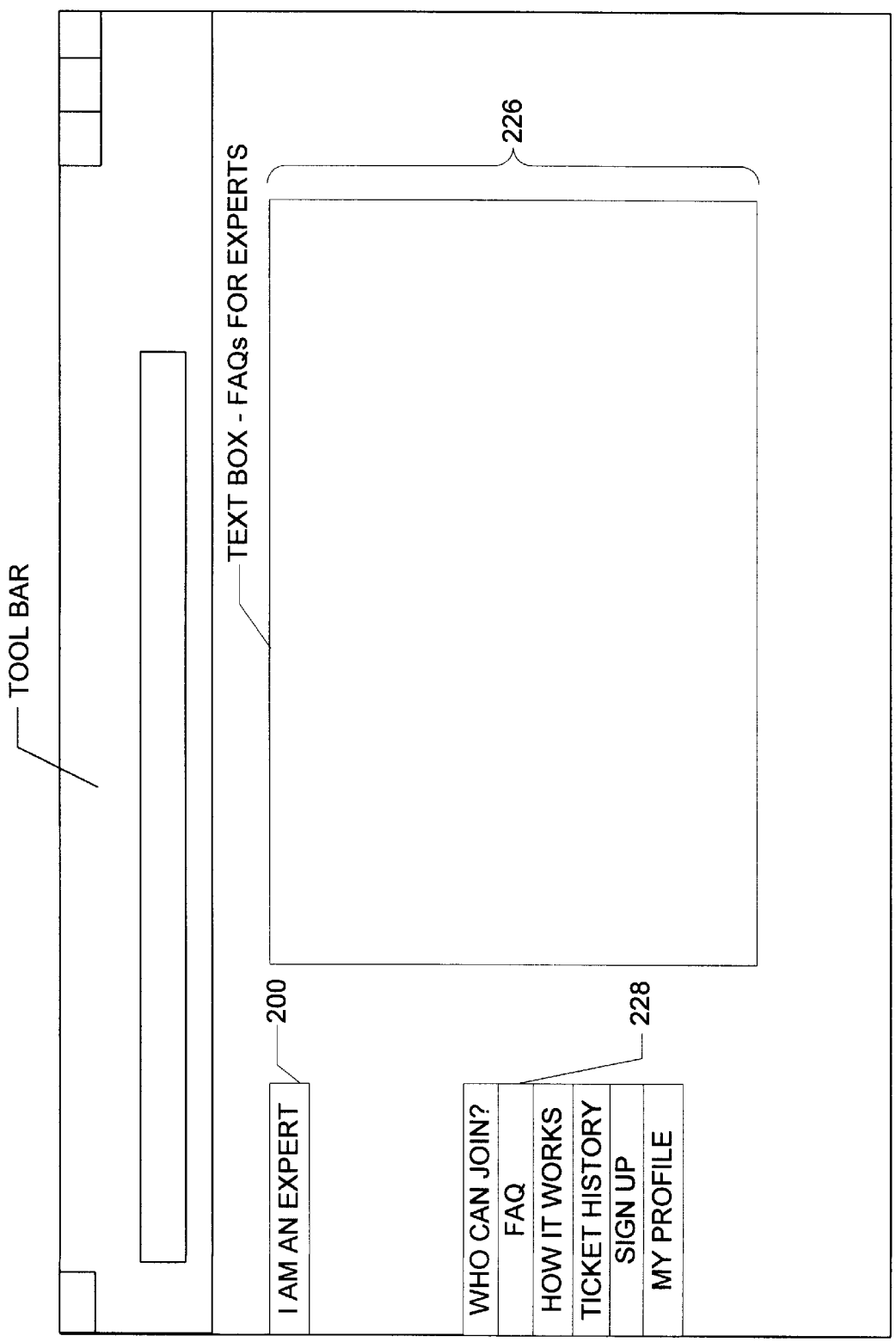
FIG. 12 illustrates a plurality of criteria for IT experts to join the Expert Help Network.
Figure 13:
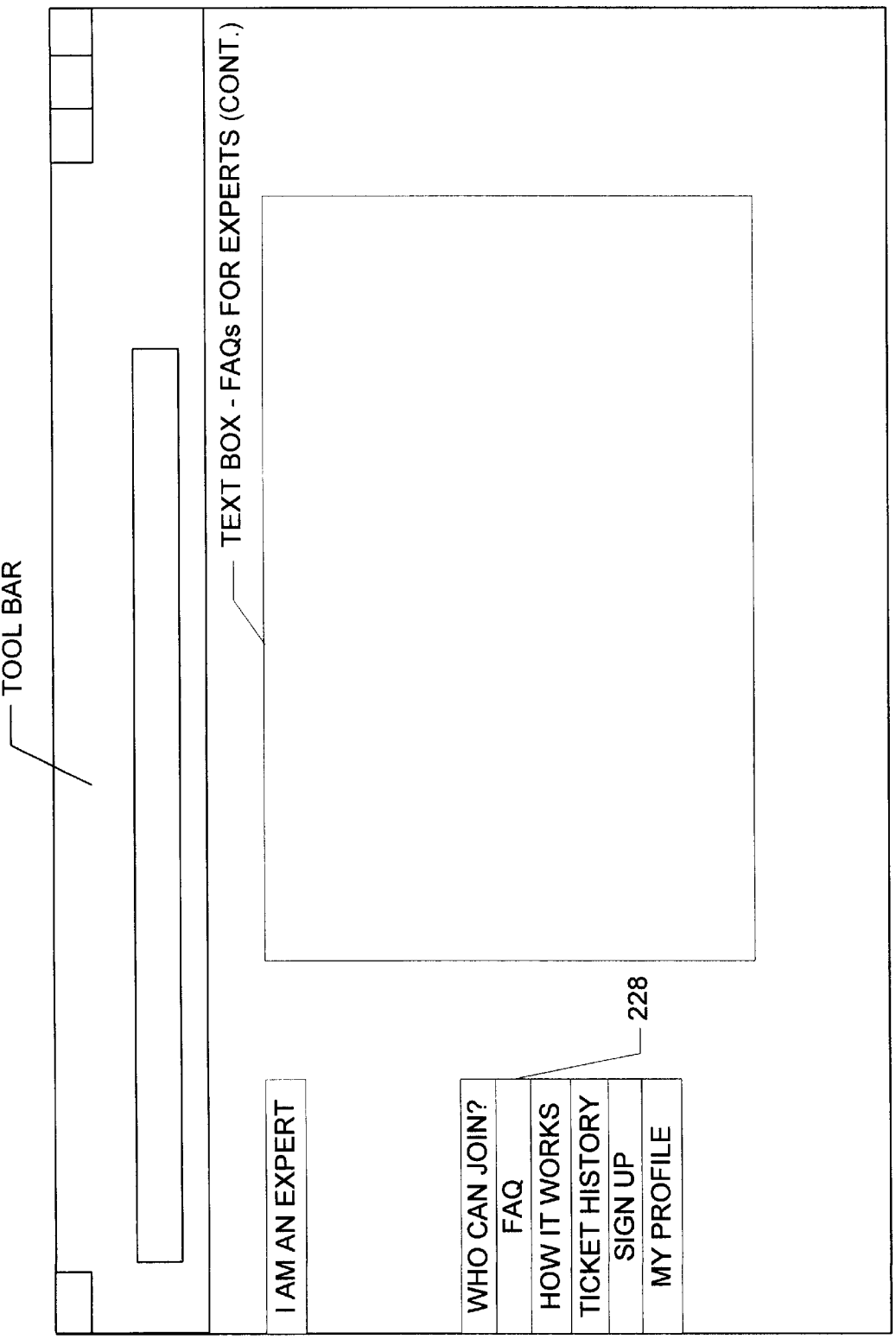
FIG. 13 illustrates a plurality of questions and answers pertaining to IT experts.

If the customer selects the "I am an IT expert" option 200, the customer is presented with a screen, FIG. 12, which gives some of the criteria for IT experts to join the IT expert Help Network 226. If the customer selects the "FAQ" (frequently asked questions) button 228, he is presented with a screen, FIG. 13, which answers a number of question pertaining to IT experts and the IT expert Help Network.

Figure 14:
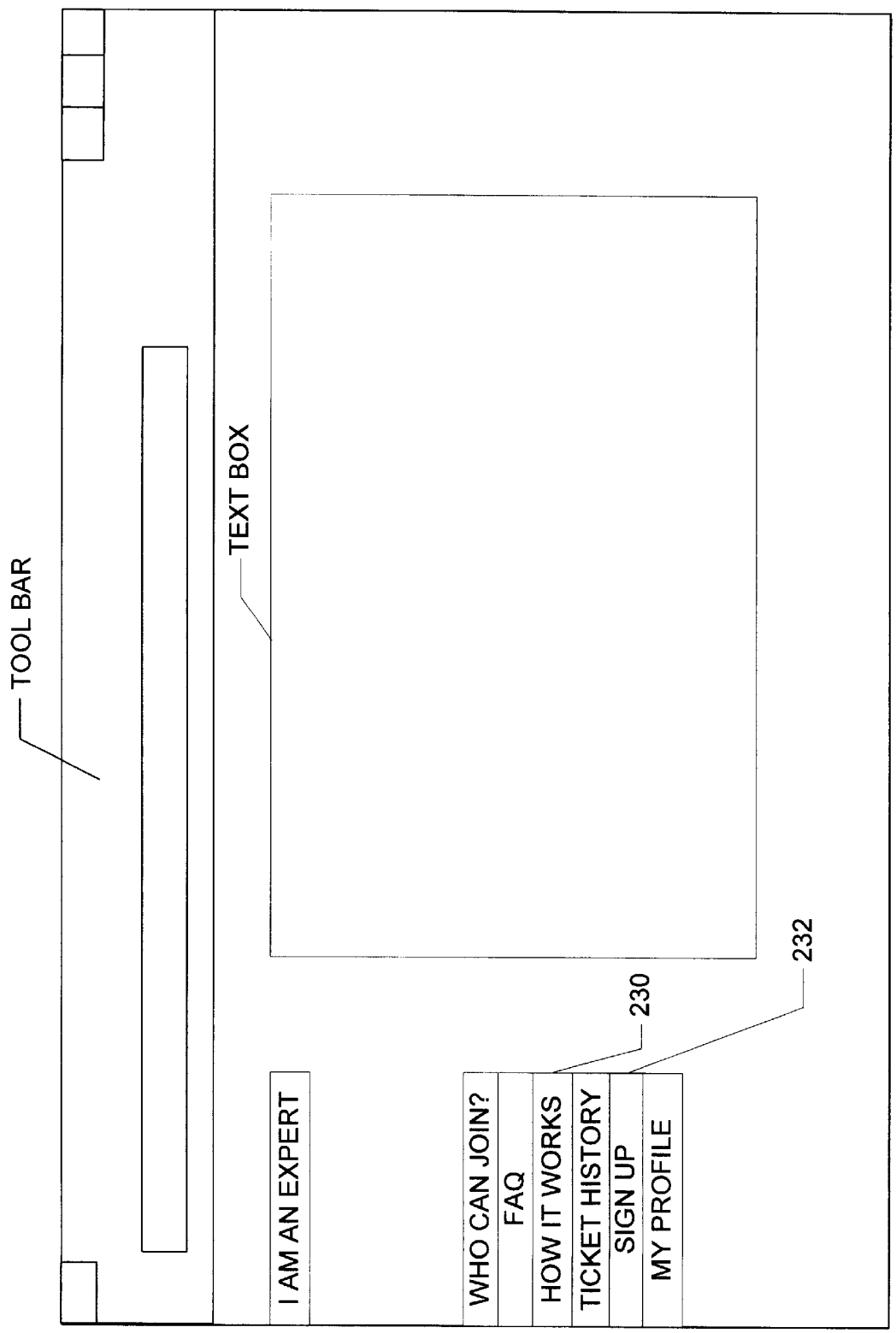
FIG. 14 illustrates a synopsis of how the network functions and the role of IT experts.

If the customer selects the "How it works" button 230, he is presented with a screen, FIG. 14, which gives a synopsis of how the IT expert Help Network functions and the function of IT experts in the network.

Figure 16:
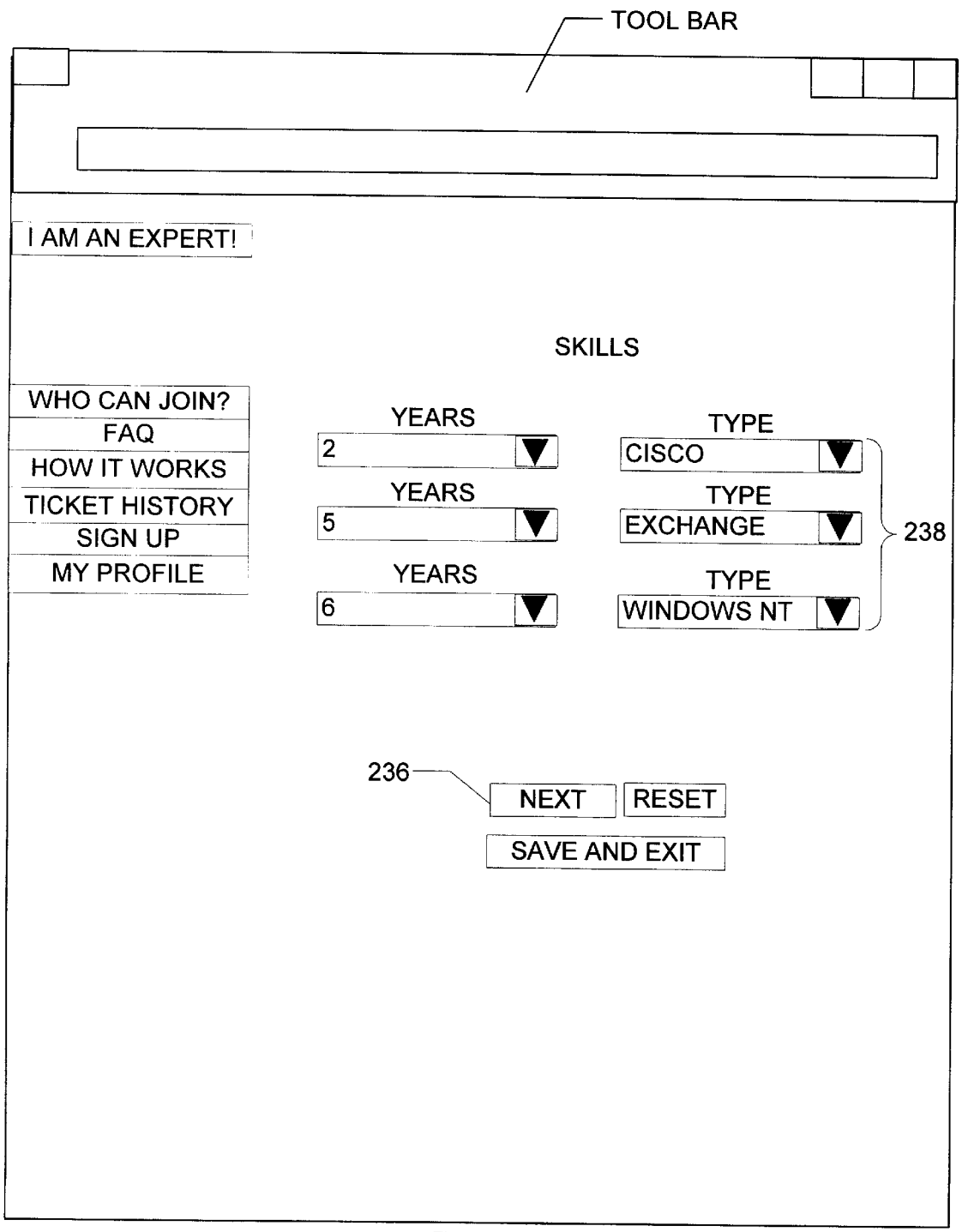
FIG. 16 illustrates a plurality of pull down menus regarding the IT expert's skills.

If the customer selects the "Sign up" button 232, he is presented with a screen, FIG. 15, which furnishes a plurality of requests for items of information regarding contact information for the IT expert 234. Upon selecting the "Next" button 236, the customer is presented with a screen, FIG. 16, with a plurality of pull down menus regarding his skills 238.

Figure 17:
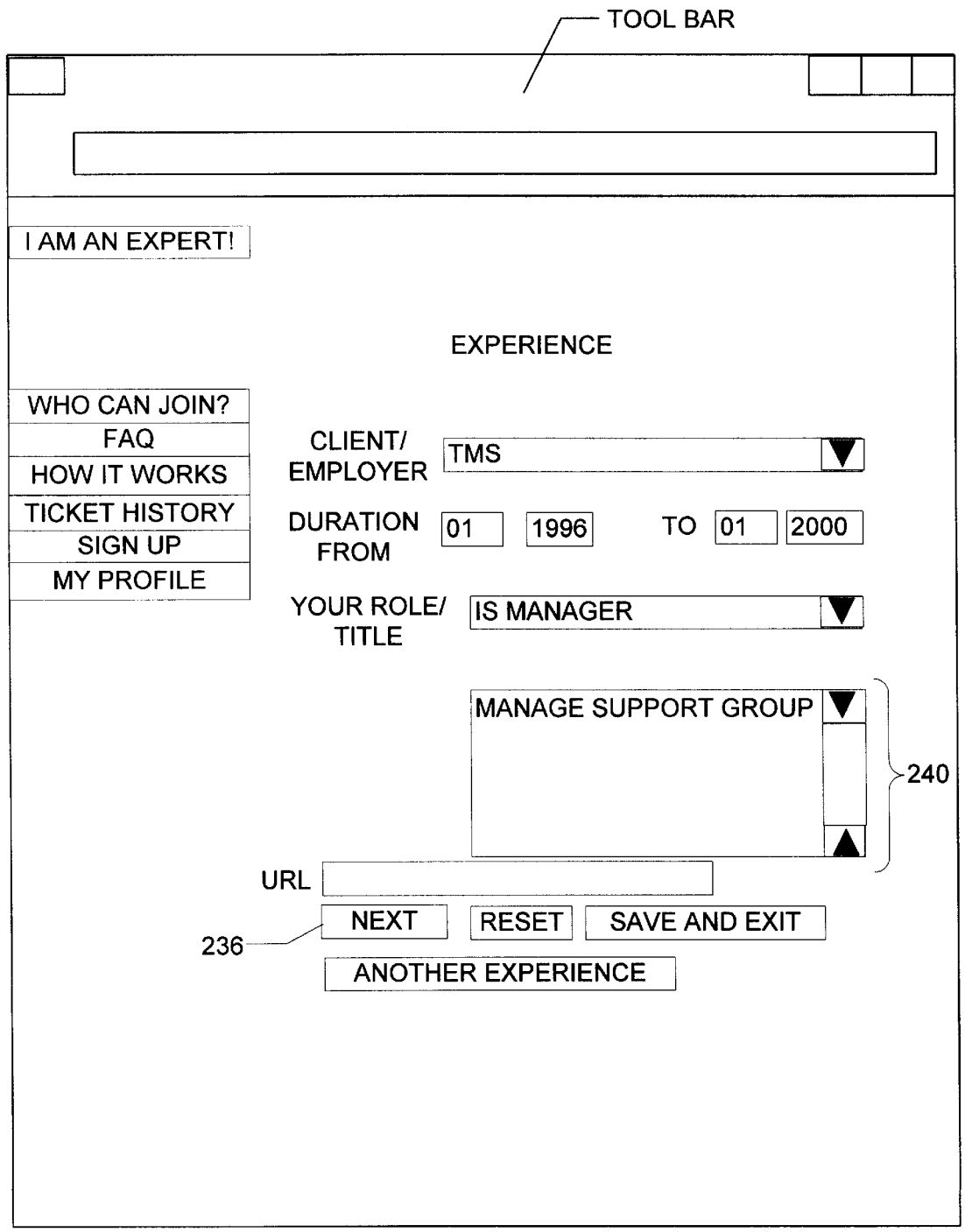
FIG. 17 illustrates a request for a plurality of items of information regarding experience as an IT expert.
Figure 18:
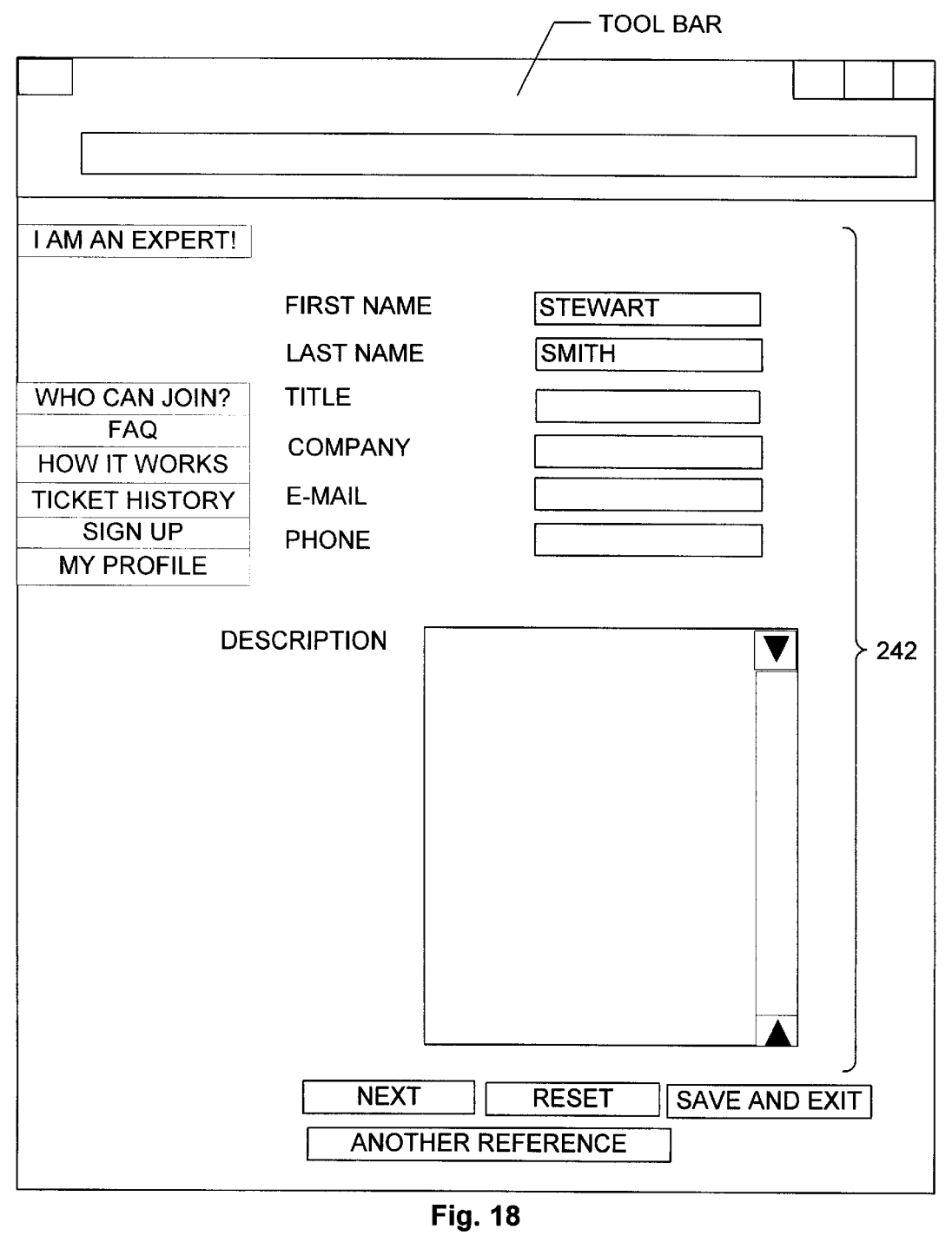

If the customer selects the "Next" button 236, he is presented with a screen, FIG. 17, which requests a plurality of items of information regarding his experience as an IT expert 240. If the customer selects the "Next" button 236, he is presented with a screen, FIG. 18, which requests a plurality of items of information regarding references as well as a text box for entering data pertinent to the reference 242.

Figure 19:
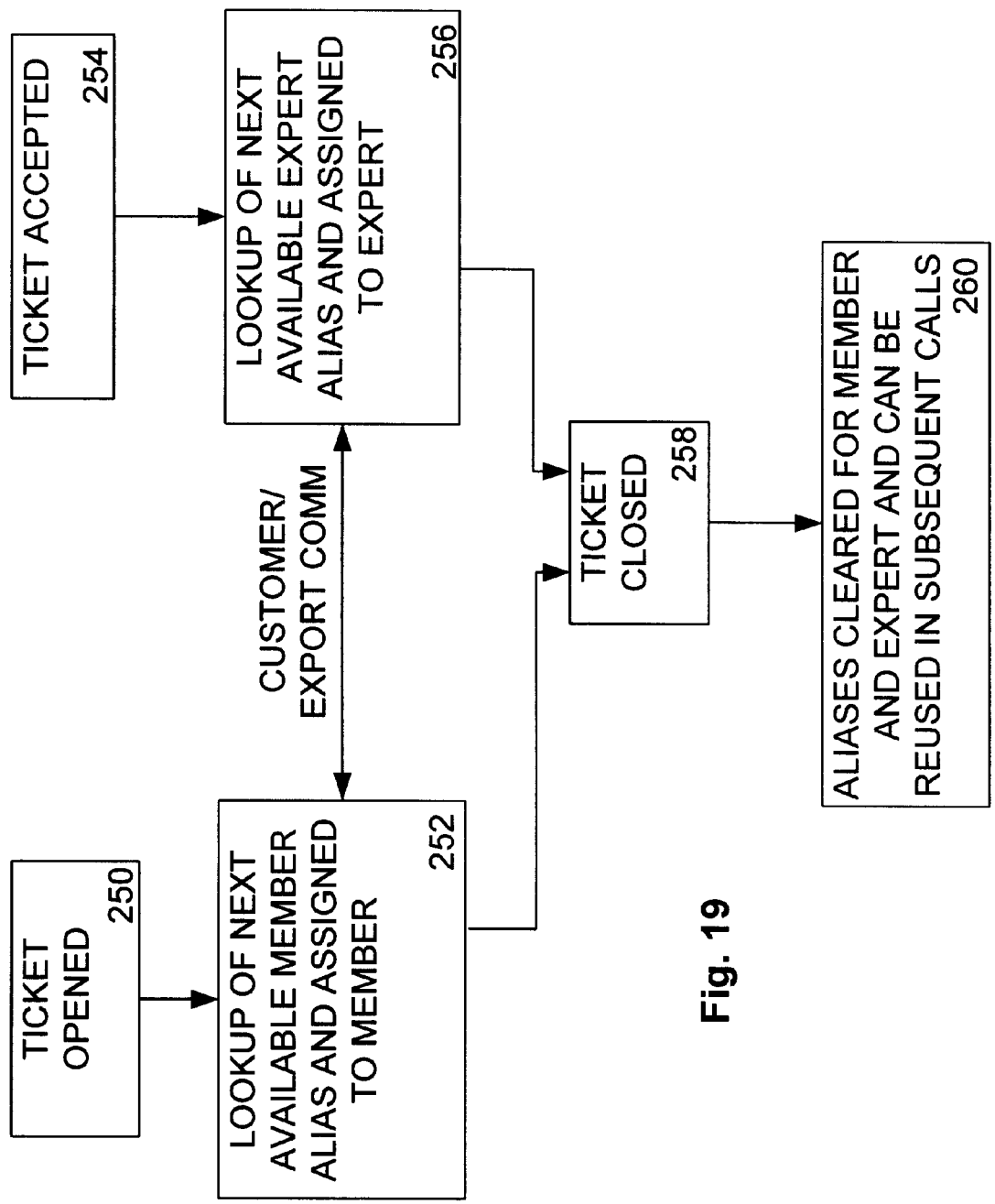
FIG. 19 illustrates the conceptual flow for assigning an alias to customer problems and IT expert's assignments.

Referring to FIG. 19, the present invention performs an "aliasing" function to both ensure that communication between the ultimate client and the IT expert occurs through the server of the present invention.

When a ticket is open 250, the server creates an alias 252 for the ticket that is open. This alias is assigned to not only the ticket, but is associated with the person or entity that is having the particular problem. In this fashion, the server can always determine who the point of contact is at the customer entity for billing and survey purposes.

The ticket number with the associated alias is then made available to IT experts to respond to. When an IT expert accepts the particular troubled ticket 254, the IT expert is assigned an alias 256 which is associated with the ticket alias created 252. This IT expert alias 256 varies from ticket to ticket so that a particular IT expert who accepts five different tickets may in fact have five different aliases associated with the different tickets. All communication with respect to the problem occurs via the server which then associates the various ticket and IT expert aliases and ensures that communication reaches the ultimate customer from the IT expert.

When the ticket is closed 258, the various aliases are cleared 260 and these aliases are subsequently made available for further tickets and aliases. Thus, the unique alias for the ticket and for the IT expert accepting the ticket occur only so long as the ticket is opened. Once the ticket is closed, the alias identifiers are made available again for re-use.

It will therefore be apparent to those skilled in the art that other variations of the present invention in contacting IT experts via wired and wireless networks and in contacting customers by the IT experts using both wired and wireless means can be achieved without departing from the scope of the invention as disclosed.

I claim:

1. A system for obtaining IT expert referral comprising:
   a server further comprising a file of information technology (IT) experts having qualifications;
   a network connected to the server for allowing access to the file of IT experts;
   at least one user computer connected to the network for submitting a request for assistance ticket from a user, said request for assistance ticket requiring an IT expert having specific qualifications:
   the server further comprising assignment instructions adapted to assign the request for assistance ticket to at least one IT expert for response and adapted to receive a response from the at least one IT expert to the assignment;
   the server further comprising communication means for facilitating the communication between the IT expert and the user regarding the request for assistance ticket; and the server further comprising instructions adapted to create a quality ranking for each IT expert based on user satisfaction questionnaire data;

wherein said assignment instructions are adapted to contact successive groups of IT experts having qualifications matching said specific qualifications on a priority basis of highest quality rankings until at least one IT expert sends a response; and wherein said quality ranking for each IT expert based on user satisfaction questionnaire data is continuously updated upon collection of additional user satisfaction questionnaire data related to the communication between the IT expert and the user regarding the request for assistance ticket.

2. The system for obtaining IT expert referral of claim 1 wherein the server further comprises instructions adapted to register and qualify IT experts to be resident on the file of IT experts.

3. The system for obtaining IT expert referral of claim 2 wherein the assignment instructions further comprise contact information for contacting the plurality of IT experts.

4. The system for obtaining IT expert referral of claim 2 wherein the instructions adapted to register and qualify IT experts are further adapted to record the availability of IT experts to respond to requests for assistance and the areas of IT expertise of the IT expert.

5. The system for obtaining IT expert referral of claim 4, wherein said file of IT experts includes the availability of IT experts and the instructions adapted to assign only assign IT experts having present availability.

6. The system for obtaining IT expert referral of claim 1 wherein the server further comprises instructions adapted to send a satisfaction questionnaire to the user to collect said user satisfaction questionnaire data used to create said quality ranking upon completion of the request for assistance ticket by the IT expert to whom the request for assistance ticket was assigned.

7. The system for obtaining IT expert referral of claim 6 wherein the server further comprises instructions adapted to pay the IT expert based upon the satisfaction questionnaire data from the user.

8. The system for obtaining IT expert referral of claim 1 wherein the server further comprises instructions adapted to assign an alias to the request for assistance from a user and adapted to assign an alias to the IT expert who responds to the request for assistance.

9. The system for obtaining IT expert referral of claim 8 wherein communication means for facilitating the communication between the IT expert and the user are provided by the server and wherein the server comprises a file of assigned aliases for routing messages between the IT expert assigned to the request for assistance and the user making the request for assistance.

10. The system for obtaining IT expert referral of claim 1 wherein the server further comprises instructions adapted to allow a user or an IT expert to view a status of tickets.

11. A method for IT expert referral comprising:

a user requesting assistance of an information technology (IT) expert having specific qualifications over a first network;

a server receiving the request for assistance and creating a ticket associated with the request;

the server selecting a plurality of qualified IT experts from a file of IT experts having appropriate qualifications, wherein each IT expert has a quality ranking determined by user satisfaction questionnaire data;

the server communicating the ticket to successive groups of said plurality of qualified IT experts over a second network on a priority basis of highest quality ranking until at least one IT expert responds to the ticket;

the server facilitating communication between the IT expert and the user to solve the ticket; and the server continuously updating said quality ranking for each IT expert determined by user satisfaction questionnaire data upon collection of additional user satisfaction questionnaire data related to the communication between the IT expert and the user to solve the ticket.

12. The method for IT expert referral of claim 11 wherein the plurality of IT experts is created by registering IT experts and verifying their qualifications before communicating the ticket to any one IT expert.

13. The method for IT expert referral according to claim 11 wherein the first network is the Internet and the second network is the Internet.

14. The method for IT expert referral according to claim 11 wherein the first network is the Internet and the second network is a PSTN.

15. The method for IT expert referral according to claim 11 wherein the first network is the Internet and the second network is a wireless network.

16. The method for IT expert referral according to claim 11 wherein the facilitating of communication comprises the server assigning an alias to the user and an alias to the IT expert; and passing communication between the IT expert and the user through the server by associating the user alias and the IT expert alias.

17. The method for IT expert referral according to claim 16 further comprising the server clearing the aliases upon completion of the ticket.

18. The method for IT expert referral according to claim 11 further comprising:

the IT expert closing the ticket with the server upon completion of the ticket by the IT expert; and the server submitting a satisfaction questionnaire to the user upon the completion of the ticket by the IT expert to collect said user satisfaction questionnaire data used to determine quality ranking of said IT expert.

19. The method for IT expert referral according to claim 18 further comprising assigning subsequent tickets to the IT expert based upon the IT expert ranking.

20. The method for IT expert referral according to claim 18 further comprising paying the IT experts based upon the satisfaction questionnaire data.

* * * * *